United States Patent
Mayer

(10) Patent No.: US 6,468,011 B2
(45) Date of Patent: Oct. 22, 2002

(54) PRECISION FASTENER ASSEMBLY HAVING A PRE-COMPRESSED CAPTIVE SPRING

(75) Inventor: David W. Mayer, Fort Collins, CO (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/774,729

(22) Filed: Jan. 31, 2001

(65) Prior Publication Data

US 2002/0102147 A1 Aug. 1, 2002

(51) Int. Cl.[7] ............................ F16B 21/18; F16B 43/02
(52) U.S. Cl. ...................... 411/353; 411/107; 411/153; 411/544; 411/999
(58) Field of Search ................................. 411/107, 153, 411/352, 353, 368, 371.2, 544, 552, 999

(56) References Cited

U.S. PATENT DOCUMENTS

| 4,442,571 A | * | 4/1984 | Davis et al. ................. 411/552 |
| 4,720,223 A | * | 1/1988 | Neights et al. ......... 411/544 X |
| 4,915,557 A | * | 4/1990 | Stafford ................... 411/353 X |
| 5,690,460 A | * | 11/1997 | Attanasio ................ 411/552 X |

* cited by examiner

Primary Examiner—Neill Wilson
(74) Attorney, Agent, or Firm—Kevin M. Hart

(57) ABSTRACT

A fastener assembly includes a threaded fastener having an axial shaft. A spring is disposed coaxially around the shaft and is capable of compression and expansion in the longitudinal direction defined by the shaft. First and second stops are disposed along the shaft. The spring is pre-compressed and is disposed between the stops so that its expansion is limited by the stops. One end of the spring is mechanically coupled to a work piece. When the fastener is turned, relative displacement develops between the shaft and the work piece. The displacement causes the spring to further compress as the work piece end of the spring and the second stop move away from one another. The force of the compressed spring is transferred to the work piece.

13 Claims, 4 Drawing Sheets

PRECISION FASTENER ASSEMBLY HAVING A PRE-COMPRESSED CAPTIVE SPRING

FIELD OF THE INVENTION

This invention relates to precision fasteners, and more particularly to precision fastener assemblies that incorporate a spring.

BACKGROUND

Precision fasteners are used to couple components together with a measured or otherwise approximately known amount of force. One class of precision fastener assemblies accomplishes this purpose by incorporating a spring having a known ratio of force to compression distance. For example, a given spring might be capable of applying X pounds of force in the axial direction for every Y inches of compression relative to a relaxed length. The ratio of force to compression for such a spring could be specified as X:Y. Fastener assemblies that operate according to this principle generally include a threaded fastener, such as a screw, having a known thread pitch. Because the thread pitch is known, a precise degree of axial displacement can be achieved with a corresponding number or turns of the screw. The screw and spring are oriented so that the spring is compressed as the screw is turned. Thus, a precise amount of spring force may be applied by turning the screw a measured number of times.

One problem associated with such fastener assemblies is the relationship between precision, axial displacement and force magnitude: Generally, high precision force applications are more achievable using springs that have a relatively low force to compression ratio. In other words, the greater the ratio of force to compression distance for a spring, the more difficult it is to apply a precise amount of force using the spring. On the other hand, springs having a high ratio of force to compression distance are advantageous to use because fewer turns of the threaded fastener are required for such springs to achieve large-magnitude forces. Fasteners that require only a few turns during their application help to make manufacturing easier and less time consuming.

It would therefore be desirable to have a precision fastener assembly that is capable of applying large-magnitude forces in a precise manner and that does not require a large number of turns during its application.

SUMMARY OF THE INVENTION

In one aspect, an assembly according to the invention includes a threaded fastener having an axial shaft. A spring is disposed coaxially around the shaft and is capable of compression and expansion in the longitudinal direction defined by the shaft. First and second stops are disposed along the shaft. The spring is pre-compressed and is disposed between the stops so that its expansion is limited by the stops. One end of the spring is mechanically coupled to a work piece. When the fastener is turned, relative displacement develops between the shaft and the work piece. The displacement causes the spring to further compress as the work piece end of the spring and the second stop move away from one another. The force of the spring is transferred to the work piece.

Because the spring is pre-compressed prior to application of the fastener to the work piece, large-magnitude forces may be achieved with relatively few turns of the fastener at the time of its application. In addition, relatively low force to compression ratio springs may be used to implement the device. Thus, the inventive fastener not only is capable of maintaining the precision associated with low-ratio springs, but is also simultaneously capable of achieving large-magnitude forces while requiring relatively few turns of the fastener at the time of its application to the work piece.

DETAILED DESCRIPTION OF THE PREFERRED EMBODIMENTS

Figure 1:
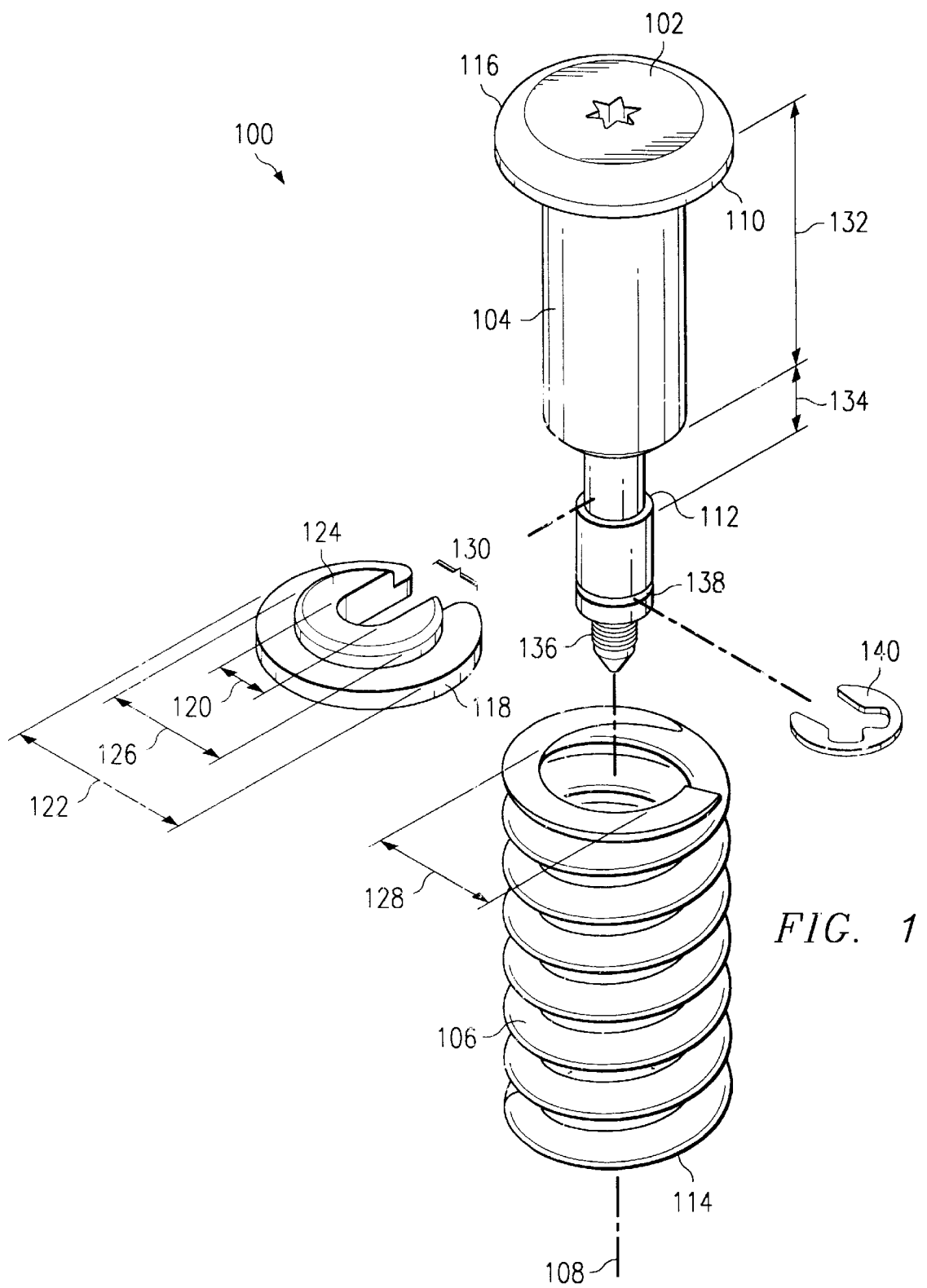
FIG. 1 is an oblique exploded view illustrating components of a fastener assembly according to a preferred embodiment of the invention.

FIG. 1. illustrates components of a fastener assembly 100. Fastener assembly 100 includes a threaded fastener 102 having an axial shaft 104. Head 116 is disposed at one end of shaft 104, and threads 136 are disposed at the other end of shaft 104. A suitable driver may be engaged with head 116 in order to turn fastener 102. Shaft 104 includes a first segment 132, a second segment 134, and a shoulder 112. The diameter of second segment 134 is smaller than the diameter of first segment 132. Shaft 104 also includes a circular recess 138 for receiving a retaining clip 140. Assembly 100 also includes a spring 106 and a washer 118.

Figure 2A:
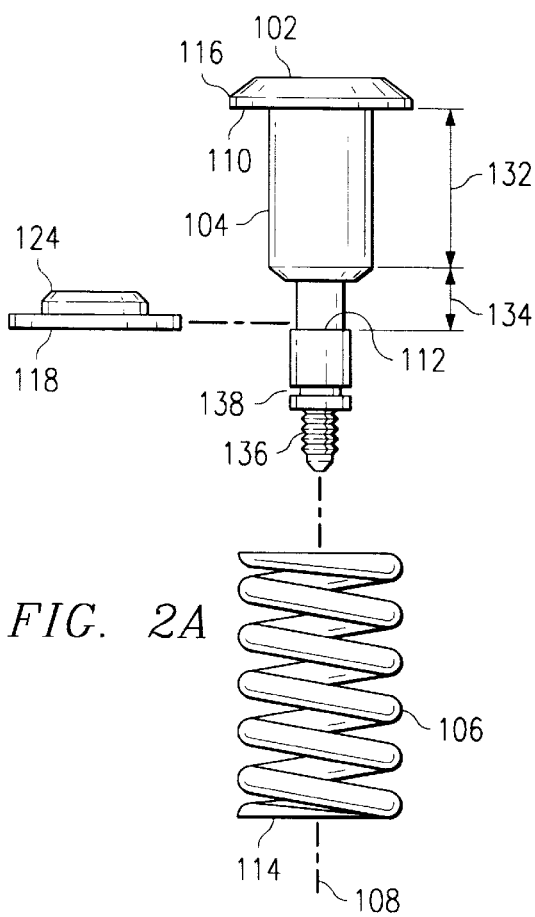
FIGS. 2A–2D are orthogonal views illustrating a preferred method of assembling the components of FIG. 1.
Figure 2B:
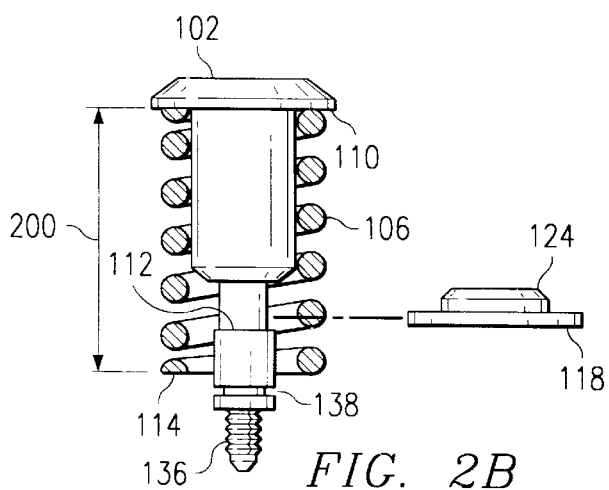
Figure 2C:
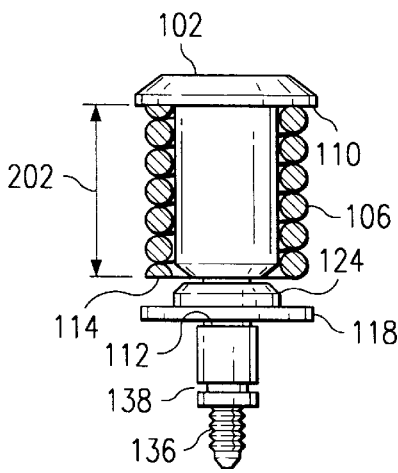
Figure 2D:
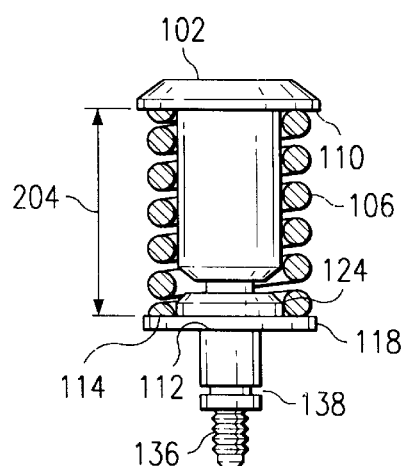

FIGS. 2A–2D illustrate a method for assembling the components shown in FIG. 1. Spring 106 is slipped onto shaft 104 so that spring 106 is coaxially disposed around first segment 132 and second segment 134. The underside of head 116 faces spring 106 and acts as a first stop 110. When the top end of spring 106 rests against stop 110, the relaxed length 200 of spring 106 extends beyond shoulder 112 of shaft 104. as shown in FIG. 2B. Spring 106 is then compressed to a shorter length 202, as shown in FIG. 2C, so that washer 118 may be installed onto shaft 104 between shoulder 112 and work piece end 114 of spring 106. Washer 118 is installed orthogonally onto shaft 104 so that slot 130 fits around second segment 134 of shaft 104. Once this has been done, spring 106 is allowed to relax until it comes to rest against washer 118, as shown in FIG. 2D.

Washer 118 has an inside diameter 120 that is small enough so that washer 118 engages shoulder 112. (Preferably, slot 130 is just large enough to clear the diameter of second segment 134 of shaft 104.) Because diameter 120 is small enough to engage shoulder 112, shoulder 112 acts as a second stop—the underside of head 116 being the first stop. Washer 118 has an outside diameter 122 that is large enough to engage the work piece end 114 of spring 106, and also large enough to engage a work piece 300 (to be further described below).

In the assembled position shown in FIG. 2D, spring 106 has a pre-compressed length 204 that is shorter than its relaxed length 200. Spring 106 is disposed between stops 110, 112, and any further expansion beyond pre-compressed length 204 is limited by the stops. Work piece end 114 of spring 116 is nearer stop 112 than is the other end of spring 106. Although expansion of spring 106 beyond pre-compressed length 204 is limited by stops 110, 112, spring 106 is free to be further compressed from its pre-compressed position and then expanded back to its pre-compressed position in the longitudinal direction 108 defined by shaft 104.

The side of washer 118 facing spring 106 has a raised portion 124 formed thereon. The outside diameter 126 of raised portion 124 is not greater than the inside diameter 128 of spring 106. Preferably, outside diameter 126 is approximately equal to or just smaller than inside diameter 106 so that raised portion 124 will extend inside work piece end 114 of spring 106 when the two pieces are engaged. Raised portion 124 serves the purpose of keeping washer 118 retained in assembly 100 during operation of assembly 100. The diameter of first segment 132 is not greater than the inside diameter 128 of spring 106. Preferably, the diameter of first segment 132 is approximately equal to or just less than the inside diameter 128 of spring 106. First segment 132 serves the purpose of keeping spring 106 aligned with the axis of shaft 104 during operation of assembly 100, further ensuring that washer 118 will be retained.

Figure 3:
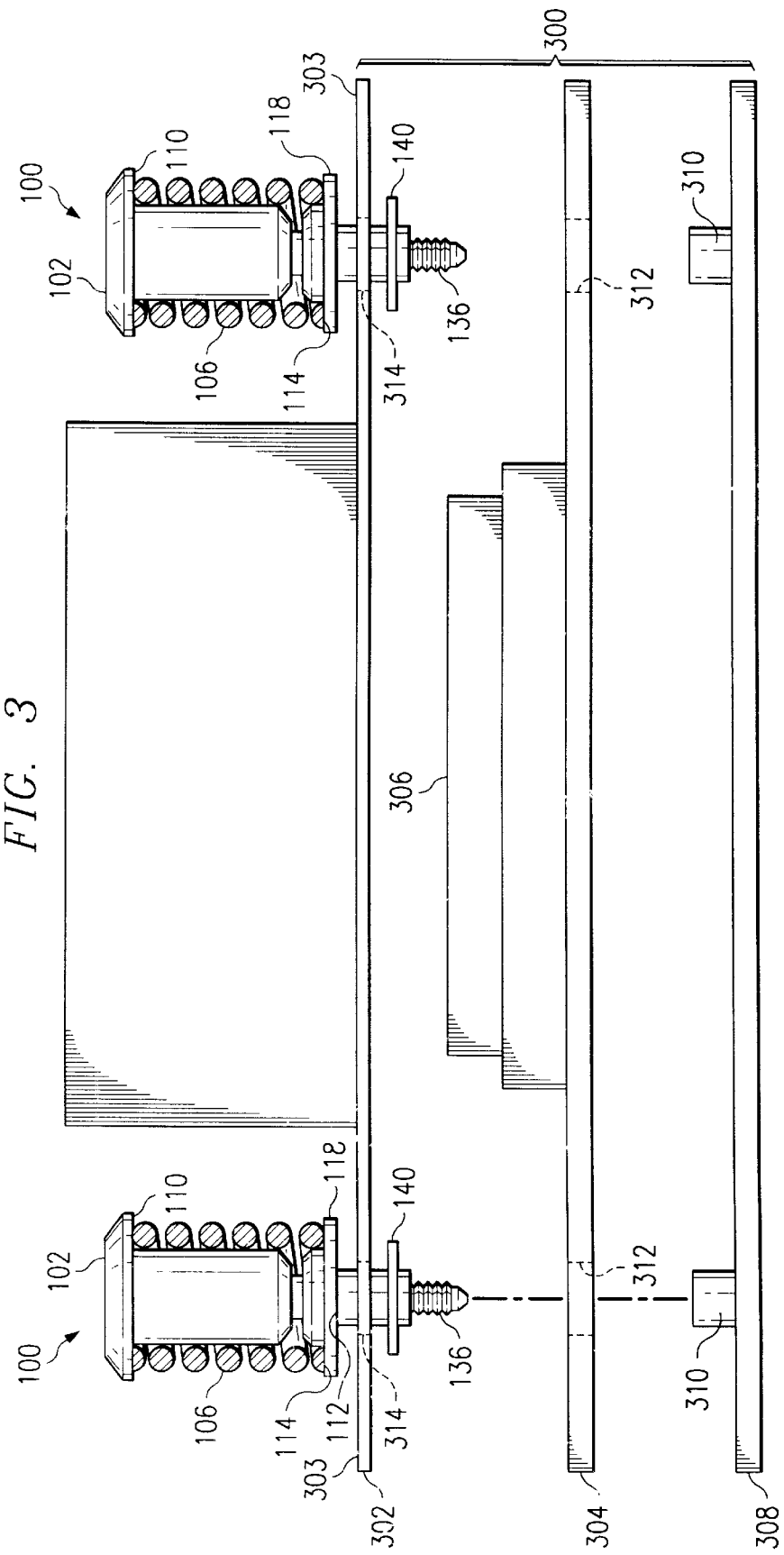
FIG. 3 is an orthogonal exploded view illustrating an example work piece to be coupled together using fastener assemblies like that of FIG. 1.
Figure 4:
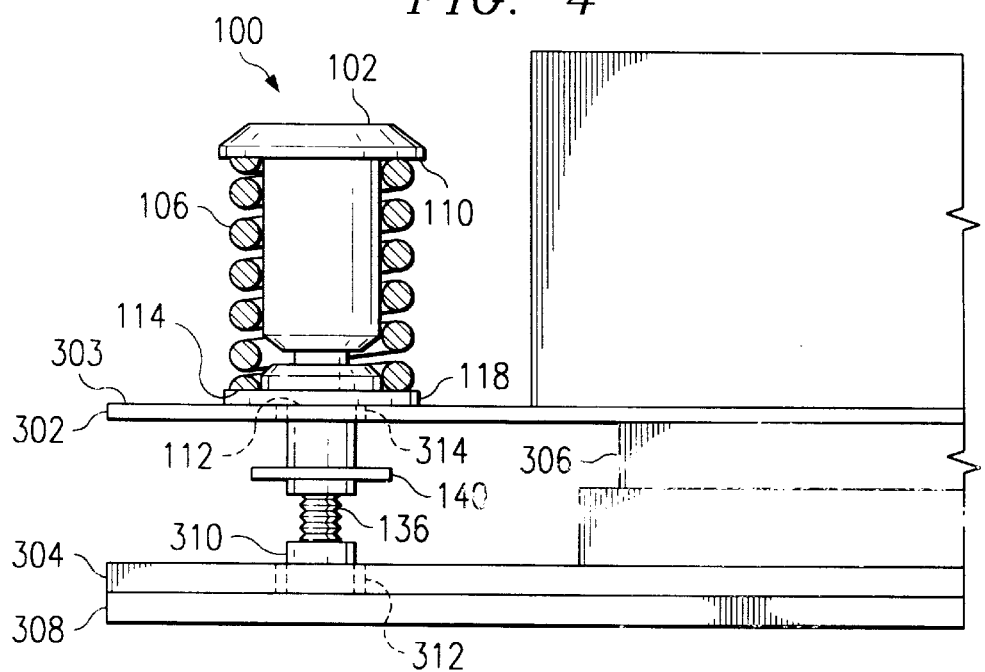
FIG. 4 is an orthogonal partially assembled view of the components of FIG. 3.
Figure 5:
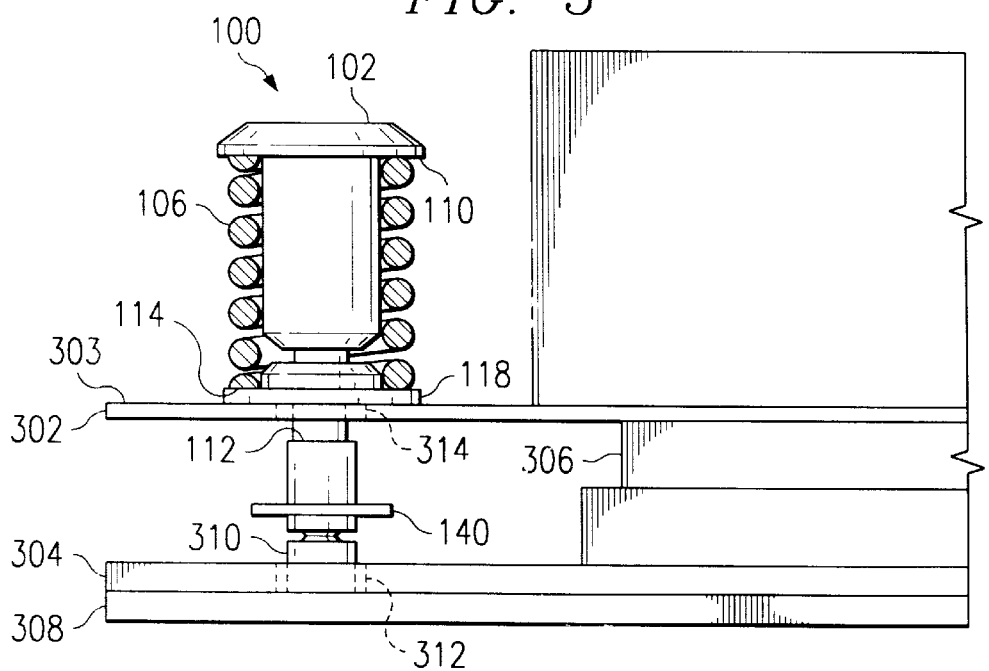
FIG. 5 is an orthogonal fully assembled view of the components of FIG. 3.

FIGS. 3–5 illustrate one example of how fastener assembly 100 may be employed to couple components of a work piece together. In the example shown, work piece 300 includes a heatsink 302, a bolster plate 308, and a printed circuit board 304 having an integrated circuit 306 mounted thereon. Bolster plate 308 includes female threaded protrusions 310 adapted to engage threads 136 of shaft 104. Holes 312 in printed circuit board 304 are large enough to clear protrusions 310. Holes 314 in heatsink 302 are large enough to clear the portions of shaft 104 that extend below first segment 132. But holes 314 are small enough so that the top surface 303 of heatsink 302 will engage the side of washer 118 opposite spring 106 when assembly 100 is inserted into heatsink 302 as shown in FIGS. 3–5.

Once assembly 100 has been so inserted into holes 314 as shown in FIG. 3, retaining clip 140 may be installed into circular recess 138. The outside diameter of retaining clip 140 is larger than the diameter of holes 314. Therefore, assembly 100 will remain coupled to heatsink 302 once clip 140 has been installed as shown in FIG. 3.

When the components of work piece 300 are brought together as shown in FIG. 4 and threads 136 are engaged with protrusions 310, the side of washer 118 opposite spring 106 engages the top surface 303 of heatsink 302. Fastener 102 may then be turned to tighten the assembly. As fastener 102 is turned, the resulting relative displacement between shaft 104 and work piece 300 causes shoulder 112 to separate from work piece end 114 of spring 106 and washer 118 as shown in FIG. 5. This action further compresses spring 106 relative to its pre-compressed position, and the force of spring 106 is transferred to the top surface 303 of work piece 300 as desired.

In an embodiment such as that illustrated in FIGS. 3–5, it is possible for a severe mechanical shock to cause work piece 302 to momentarily rise up from chip 306 by further compressing spring 106. To address this possibility, the length of first segment 132 may be designed so that the end of segment 132 closest to second stop 112 will be very close to top surface 303 of work piece 302 after fastener 100 has been screwed down to the desired tightness. If this is done, any gross upward movement of work piece 302 will be limited by the end of segment 132.

While the invention has been illustrated herein with reference to an example embodiment, other embodiments remaining within the scope of the appended claims are possible. For example, stops 110, 112 may implemented using any suitable protrusion from shaft 104; they need not be implemented as a fastener head or as a circular shoulder as they are in the illustrated embodiment. Work piece end 114 of spring 106 need not be coupled to the work piece via washer 118 in every embodiment, but may instead be coupled thereto by other suitable means, such as with a protrusion extending from or into spring 106, or with a coupling device other than or in addition to washer 118. Not all embodiments need to include a fastener having a head thereon; and alternative embodiments may have threads 136 located elsewhere than on the end of fastener 102. Other variations of the illustrated embodiment that nevertheless fall within the scope of the appended claims will be apparent to those having ordinary skill in the art.

What is claimed is:

1. A fastener assembly, comprising:
   a threaded fastener having an axial shaft;
   a spring disposed coaxially around the shaft and capable of compression and expansion in the longitudinal direction defined by the shaft;
   first and second stops disposed along the shaft;
   wherein the spring is pre-compressed and is disposed between the stops so that its expansion is limited by the stops;
   wherein a work piece end of the spring nearest the second stop is adapted to engage a work piece such that, when the threaded fastener is turned, the resulting relative displacement between the shaft and the work piece causes the spring to further compress as the work piece end of the spring and the second stop move away from one another; and
   a washer disposed between the work piece end of the spring and the second stop.

2. The fastener assembly of claim 1, wherein the washer comprises:
   an inside diameter small enough to engage the second stop.

3. The fastener assembly of claim 1, wherein the washer comprises:
   an outside diameter large enough to engage the work piece.

4. The fastener assembly of claim 1, wherein the washer comprises:
   an outside diameter large enough to engage the work piece end of the spring.

5. The fastener assembly of claim 1, wherein the washer comprises:
   a raised portion disposed on the side of the washer facing the spring.

6. The fastener assembly of claim 5, wherein:
   the raised portion has an outside diameter not greater than the inside diameter of the spring.

7. The fastener assembly of claim 5, wherein:
   the raised portion has an outside diameter approximately equal to the inside diameter of the spring.

8. The fastener assembly of claim 1, wherein:
   the washer comprises a slot adapted to clear the shaft so that the washer may be assembled onto the shaft orthogonally during manufacture of the fastener assembly.

9. A fastener assembly, comprising:
   a threaded fastener having an axial shaft;
   a spring disposed coaxially around the shaft and capable of compression and expansion in the longitudinal direction defined by the shaft;

first and second stops disposed along the shaft;

wherein the spring is pre-compressed and is disposed between the stops so that its expansion is limited by the stops;

wherein a work piece end of the spring nearest the second stop is adapted to engage a work piece such that, when the threaded fastener is turned, the resulting relative displacement between the shaft and the work piece causes the spring to further compress as the work piece end of the spring and the second stop move away from one another; and wherein the portion of the shaft around which the spring is disposed comprises at least first and second segments, the second segment having a smaller diameter than the first segment.

10. The fastener assembly of claim 9, wherein:

the second segment is disposed closer to the work piece end of the spring than the first segment.

11. The fastener assembly of claim 9, wherein:

the diameter of the first segment is not greater than the inside diameter of the spring.

12. The fastener assembly of claim 9, wherein:

the diameter of the first segment is approximately equal to the inside diameter of the spring.

13. A fastener assembly, comprising:

a threaded fastener having an axial shaft;

a spring disposed coaxially around the shaft and capable of compression and expansion in the longitudinal direction defined by the shaft;

first and second stops disposed along the shaft;

wherein the spring is pre-compressed and is disposed between the stops so that its expansion is limited by the stops; and wherein a work piece end of the spring nearest the second stop is adapted to engage a work piece such that, when the threaded fastener is turned, the resulting relative displacement between the shaft and the work piece causes the spring to further compress as the work piece end of the spring and the second stop move away from one another; and wherein the shaft comprises a circular recess for receiving a retention clip operable to retain the fastener assembly on the work piece when the threads of the threaded fastener are not engaged with a corresponding threaded hole.

\* \* \* \* \*